United States Patent Office 2,955,947
Patented Oct. 11, 1960

2,955,947
POROUS CERAMIC PRODUCTS AND METHOD

Archibald R. Gmeiner, Waupaca, and Clarence R. Hackbert, Appleton, Wis., assignors to Kimberly-Clark Corporation, Neenah, Wis., a corporation of Delaware No Drawing. Filed Mar. 17, 1958, Ser. No. 721,689

6 Claims. (Cl. 106—41)

The present invention is concerned with the manufacture of ceramic products and is particularly related to a means for improving lightweight aggregates.

Lightweight aggregates which are used in concrete construction are conventionally made from expanded shale or other similar clays. In a typical lightweight aggregate production method, shale is crushed and mixed with a pulverized carboniferous material such as coke-breeze or anthracite coal to form a sinter mix. The sinter mix is then pelletized by passing it through a pelletizer where it is mixed with sufficient water to form the material into small pellets. The pellets which are ordinarily about ½ to 1 inch diameter spheres are transferred from the pelletizer to a travelling grate to form a bed of pellets on the grate usually 8 or 9 inches in thickness. The grate moves under a burner which ignites the layer of pellets, and then over a plurality of windboxes which draw air through the burning mix to maintain combustion. The sinter charge is discharged at the end of the grate as a fused cake or clinker, usually about 7 or 8 inches thick. This clinker is broken and then crushed, and the crushed particles sorted to obtain the desired lightweight aggregate particle sizes. The fines from the breaking and crushing operations, which include any unburned carboniferous material, is recycled.

Many of the problems involved in the production of lightweight aggregate are concerned with the formation of the pellets, and the sintering of the bed of pellets. The formation of uniform pellets and complete pelletization of the sinter mix is quite responsive to the condition of individual components of the mix and the relative proportion of the components of the mix and the added water. Variations in the type or moisture content of the clay or shale may require different proportions of water to form uniform pellets. Perhaps the greatest cause of poor pelletization however is variation in the amount of fines recycled into the mix. The fines may be composed of either clay or of the carboniferous component of the pellet charge and usually result from poor burning of the pellet charge on the grates so that there are relatively unburned portions of the bed. Excessive unburned carboniferous material is not only wasteful, but also is very injurious to the pelletizing of the mix because of the lack of cohesiveness of the coal or coke-breeze even when wet. If an excessive amount of fines are carried through the pelletizer, the resultant charge of pellets on the grate tends to be poorly burned because the fines clog the interstices between the pellets, thus cutting off the draft through the bed and preventing complete and uniform burning of the bed. Both the efficiency of the operation and the qaulity of the resultant product are affected by this non-uniform combustion of the bed.

It is an object in the present invention to provide an improved method of forming a lightweight aggregate sinter mix.

It is an additional object of the present invention to provide an additive for lightweight aggregate sinter mixes which will improve the pelletizing properties of the sinter mix and the sintering properties of the resultant charge.

Additional objects will be apparent from the description which follows.

It has been found that these and other objects of the present invention can be accomplished by mixing with the sinter mix during the pelletizing operation a composition comprising a mixture of a spent sulfite liquor which has been concentrated to a solids content of about 25–65 percent and an alkali nitrate. This composition is effective in producing uniform pellets under widely varied material conditions with a minimum of additional water. Furthermore, the resultant pellets are much more uniformly and completely burned during the sintering operation so that the fines and unburned carboniferous material resulting from the sintering operation are greatly decreased, and the resultant sinter cake is more uniform.

The sulfite liquor, which is a constituent of the composition of the present invention, is a by-product of the pulping industry. Much of the wood pulp produced in the United States is made by the sulfite process. In this process wood chips are cooked under pressure at elevated temperatures in a solution of calcium, magnesium or ammonium bisulfite containing a large excess of sulfur dioxide to produce wood pulp and a spent liquor containing the ligneous by-products, spent chemicals, etc. Following this cooking procedure the pulp is separated from the spent cooking liquor and it is this cooking liquor which is used as a component in the present composition. The spent cooking liquor normally contains between about 10 and 12 percent solids. This cooking liquor is concentrated, for example, by evaporation for use in the present composition to a solids content of about 25–65 percent, and preferably about 50 percent. It is essential that this concentration proceeding not be carried to dryness since it has been found that the dried sulfite liquor solids, which have been later suspended in water, have different properties than the concentrated sulfite liquor and are unsuitable for use in the present composition. The composition of the liquor varies but it is believed to include lignin, carbohydrates, proteins, resins, sulfur dioxide combined with lignin and calcium lignin sulfonate (or the magnesium or ammonium lignin sulfonate if those respective bisulfites are used in the pulp process). The methods by which spent sulfite liquors are obtained and the composition of typical sulfite liquors are fully described in such standard texts as Pulp and Paper Manufacture, Stephenson, 1950, McGraw-Hill; Pulp and Paper, Casey, 1952, Interscience; and Modern Pulp and Paper Making, Calkin, 3d Edition, 1957.

The alkali metal nitrate is preferably added to the concentrated sulfite liquor after the concentration has been accomplished. Any alkali nitrate, including ammonium nitrate, may be used although because of its low cost and high solubility the sodium nitrate is preferred. The nitrate is not added to the sulfite liquor before concentration, since it may tend to cause scumming or precipitation in the sulfite liquor during concentration. The amount of the nitrate added to the preconcentrated liquor may be varied over fairly wide limits, but is preferably added in an amount of about 10 to 30 percent, and preferably about 20 percent based upon the weight of the sulfite liquor solids.

The composition of the present invention is usually added to the sinter mix in the pelletizer. The addition of the composition is preferably made simultaneously with the addition of water, although it may precede or follow the water, as desired. The composition may also be diluted with water to a concentrate of about 10 percent solids and then added to the pelletizer in fixed amounts, depending on the process and production requirements. The amount of the composition added to the sinter mix may vary with the composition of the mix and the condition of sinter. Usually, however, the composition is added to the mix in an amount based upon the solids content of the composition of between about 0.1–1.0 percent by weight of the weight of the dry shale.

Now that the process and composition have been generally described they may be further illustrated by the following specific example.

*Example*

A quantity of the composition of the present invention was prepared by evaporating spent sulfite liquor from a solids content of 12 percent to a solids content of 50 percent. The sulfite liquor had a calcium base and was a commercial by-product of the pulping of northern soft woods. Sodium nitrate was then added to the concentrated sulfite liquor in an amount of 20 percent, based upon the weight of the solids in the concentrated sulfite waste liquor, and thoroughly mixed therewith. This composition was added to a sinter mix consisting of 75 percent shale (—¼"), 20 percent rerun fines (—½"), and 5 percent coke-breeze (8-mesh) in a pelletizer while water was also being added. The composition was added to the sinter mix on the basis of the total solids content in an amount of 0.3 percent of the weight of the dry clay component of the mix. The pelletizer was operated to produce about ½ inch pellets and the resultant pellets were sintered in the conventional manner. It was found that because of the improved burning characteristics of the mix the depth of the charge on the sintering grate could be increased from 8 inches to 9 inches, and the speed of the grate movement increased from 4 feet per minute to 5 feet per minute, over similar mixes not containing the present composition with no increase in the quantity of fines or unburned coke produced in the sintering operation.

While the reasons that the present composition improves the sintering characteristics of lightweight aggregate sinter mix have not been fully determined and it is not desired to be bound by any theory advanced, it is believed that the composition acts both as a binder and as a combustion aid. The presence of the composition in the pelletizer apparently results in more uniform and complete pelletization of the sinter mix even under wide variations in types of shale, moisture content, etc. The resultant reduction of fines charged to the sinter bed, permits a better draft through the bed, and the nitrate and carbonaceous components of the composition contribute to the combustion of the bed.

While the composition of the present invention has been particularly described in connection with the manufacture of lightweight concrete aggregates, it may also be employed in other operations involving the sintering of clay mixtures. The present invention is therefore limited only by the scope of the appended claims.

What is claimed is:

1. A composition consisting essentially of a preconcentrated spent sulfite liquor having a solids content of 25–65 percent and an alkali nitrate in an amount equal to 10–30 percent of the weight of the sulfite liquor solids content.

2. The composition of claim 1 in which the alkali nitrate is sodium nitrate.

3. The composition of claim 1 in which the alkali nitrate is potassium nitrate.

4. A composition consisting essentially of a preconcentrated spent sulfite liquor having a solids content of approximately 50 percent and sodium nitrate in an amount equal to about 20 percent of the weight of the sulfite liquor solids content.

5. In a process for making lightweight aggregate wherein a sinter mix of pulverized shale and pulverized carboniferous material is mixed with water, pelletized, sintered and crushed, the step which comprises mixing with the sinter mix during the pelletizing operations, a composition consisting essentially of a preconcentrated spent sulfite liquor having a solids content of about 25–65 percent and an alkali nitrate in an amount equal to about 10–30 percent of the weight of the sulfite liquor solids.

6. In a process for making lightweight aggregate wherein a sinter mix of pulverized clay and pulverized carboniferous material is mixed with water, pelletized, sintered, and crushed, the step which comprses mixing with the sinter mix during the pelletizing operation a composition consisting essentially of a spent sulfite liquor which has been pre-concentrated to a solids content of about 25–65 percent and an alkali nitrate in an amount of about 10–30 percent of the weight of the sulfite liquor solids content, said composition being added to the mix in an amount of about 0.1–1 percent of the dry weight of the clay, said percent based on the weight of the solids content of said composition.

References Cited in the file of this patent

UNITED STATES PATENTS

| | | |
|---|---|---|
| 1,752,838 | Crossman | Apr. 1, 1930 |
| 1,856,929 | Peck | May 3, 1932 |
| 2,463,994 | Nichols et al. | Mar. 8, 1949 |
| 2,627,642 | Osborne | Feb. 10, 1953 |
| 2,654,136 | Harford et al. | Oct. 6, 1953 |
| 2,706,844 | Nicholson | Apr. 26, 1955 |
| 2,833,659 | Bauer | May 6, 1958 |
| 2,839,415 | Gmeiner | June 17, 1958 |